Aug. 28, 1951 K. G. JOHNSON 2,566,063

TELEPHONE SYSTEM TEST CIRCUITS EXTENDING OVER TWO SELECTION STAGES

Filed June 27, 1947 5 Sheets-Sheet 1

INVENTOR
KARL GEORG JOHNSON

BY Leech & Radue
ATTORNEYS

Aug. 28, 1951

K. G. JOHNSON 2,566,063

TELEPHONE SYSTEM TEST CIRCUITS EXTENDING OVER TWO SELECTION STAGES

Filed June 27, 1947

5 Sheets-Sheet 2

INVENTOR
KARL GEORG JOHNSON

BY Leech & Radue
ATTORNEYS

Aug. 28, 1951

K. G. JOHNSON

TELEPHONE SYSTEM TEST CIRCUITS EXTENDING OVER TWO SELECTION STAGES 2,566,063

Filed June 27, 1947

5 Sheets-Sheet 3

INVENTOR
KARL GEORG JOHNSON

BY Leech & Radue
ATTORNEYS

Aug. 28, 1951 K. G. JOHNSON 2,566,063

TELEPHONE SYSTEM TEST CIRCUITS EXTENDING OVER TWO SELECTION STAGES

Filed June 27, 1947 5 Sheets-Sheet 4

INVENTOR
KARL GEORG JOHNSON

BY Leech & Radue
ATTORNEYS

INVENTOR
KARL GEORG JOHNSON
BY
Leech & Radue
ATTORNEYS

Patented Aug. 28, 1951

2,566,063

UNITED STATES PATENT OFFICE 2,566,063

TELEPHONE SYSTEM TEST CIRCUITS EXTENDING OVER TWO SELECTION STAGES

Karl Georg Johnson, Stockholm, Sweden, assignor to Telefonaktiebolaget L M Ericsson, Stockholm, Sweden, a company of Sweden Application June 27, 1947, Serial No. 757,622
In Sweden August 1, 1946

2 Claims. (Cl. 179—18)

In automatic telephone systems consisting of small selectors switch steps are used, which consist of two or more selection stages, so-called primary and secondary selectors, combined by means of especial lines, called links or intermediate lines. When connecting through such a switch step it is necessary that that selector pertaining to a latter selection stage which is selected in a preceding selection stage, has access to at least one free line in that traffic direction which the connection is intended for. The selection is usually made by means of registers and markers, whereby only one connection at a time may be set up through the switch step.

The present invention has for a purpose to set up a connection simply and swiftly from a calling line to a line within a called group of lines through a switch step being composed of at least two successive selection stages, whereby each of the selectors in a latter selection stage can reach only some of those lines which pertain to the called group of lines and only one communication at a time can be established under control of relay devices being individual for each selection stage, to which indicating wires from those selectors which can be used for the setting of the communication and from the lines of said group of lines are connected during the setting of the communication. This is achieved by the indicating wires of those selectors which pertain to said latter selection stage and which have access to the same lines, being connected together in a connecting point over a rectifier each, partly between themselves partly with indicating wires for those lines which may be selected by said selectors, and by circuits being closed over said rectifiers, connecting point and indicating wires to one of said individual relay devices for selection of a group of selectors, within which there is at least one free selector and which can reach at least one free line pertaining to the called group of lines, and for closing of further circuits over the indicating wires of the selectors in said group of selectors to another of said individual relay devices for selection of a free selector within the group, last-mentioned relay devices thereby being separated from said earlier mentioned relay devices of said rectifiers.

The invention will be described more closely by aid of the annexed drawings, Figures 1–7. In Figs. 1–5 a switching operation is first shown passing only two selection stages.

Fig. 1 indicates a cross-bar switch GA1, the operating bars of which constitute primary selectors in a switch step comprising moreover two cross-bar switches GB1 and GB2, whose operating- or selecting bars constitute secondary selectors.

Figure 1:
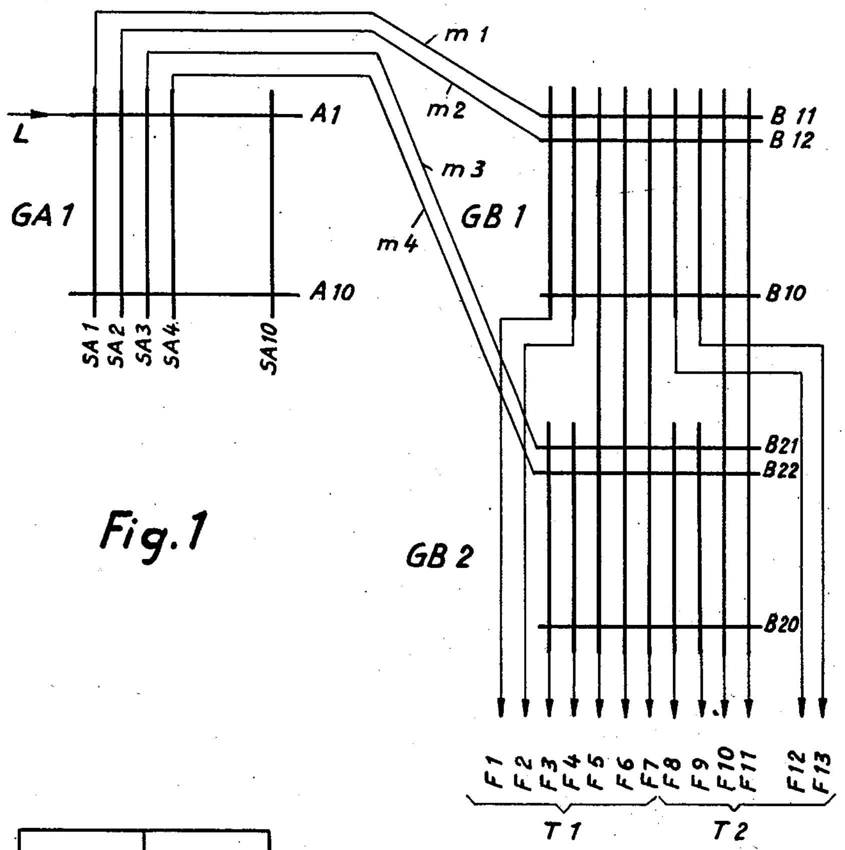
Figure 5:
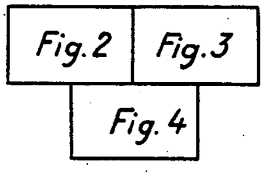
Fig. 5 shows how the Figures 1–4 should be brought together.
Figure 2:
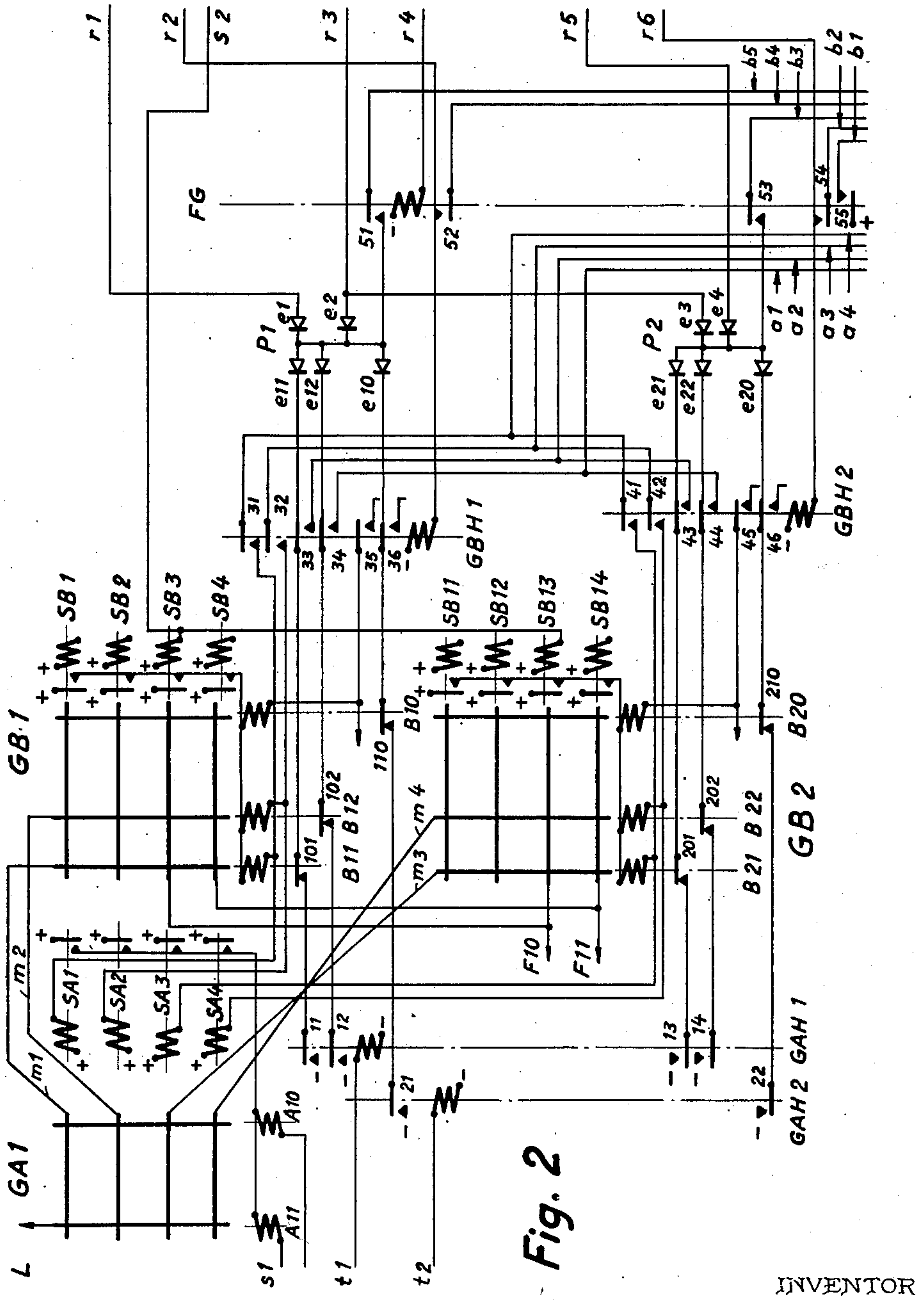
Fig. 2 shows besides the selectors GA1, GB1 and GB2 indicating wires and rectifiers for the secondary operating bars B11—B12 and B21—B22 and their connection between themselves and with the indicating wires for a number of lines F1—F13, for which those circuits which are important for the invention, have been shown in Fig. 3.
Figure 3:
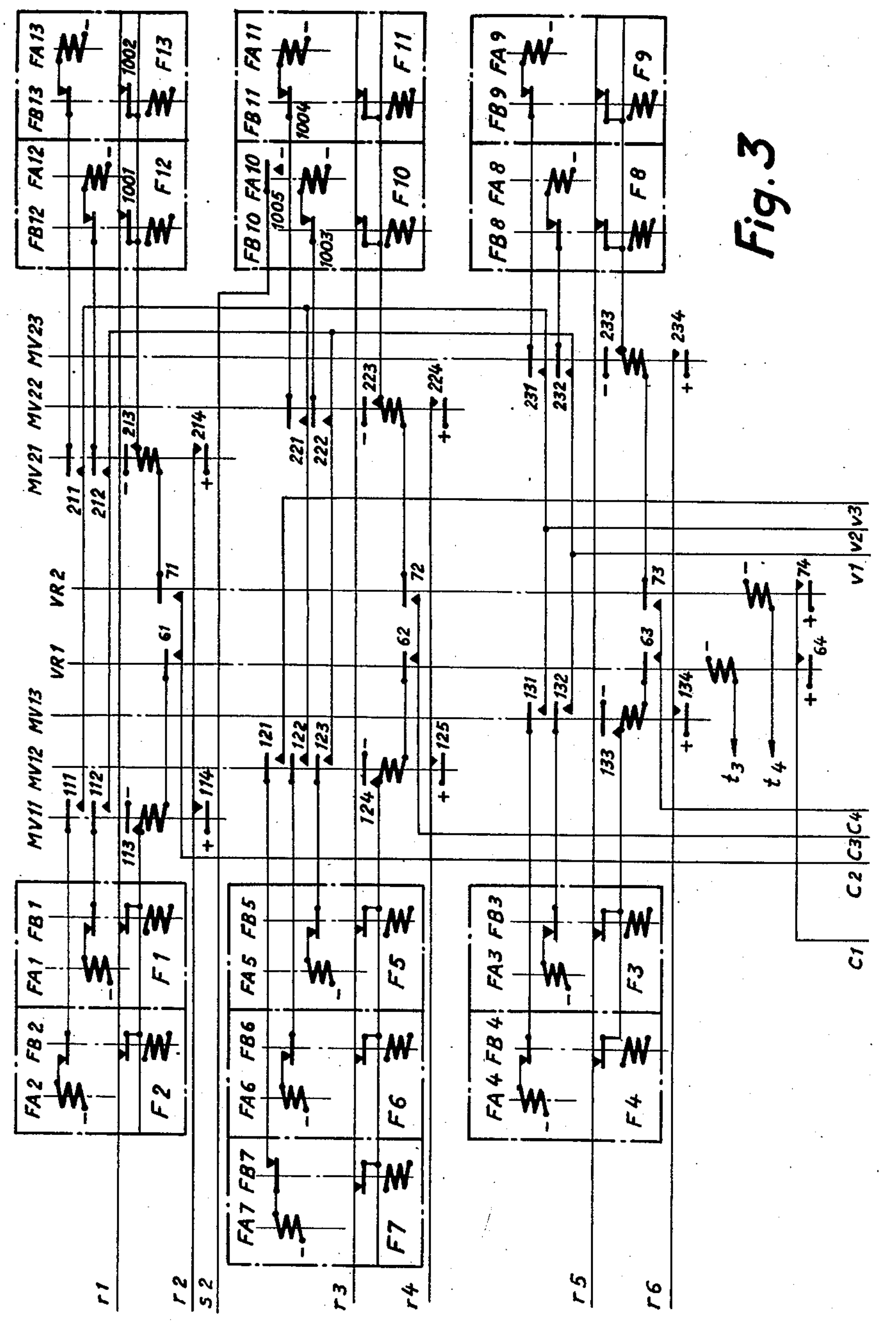
Fig. 3 shows the indicating wires for lines pertaining to two traffic directions and connection relays for connection of the indicating wires to relay devices which are individual for the switch step.
Figure 4:
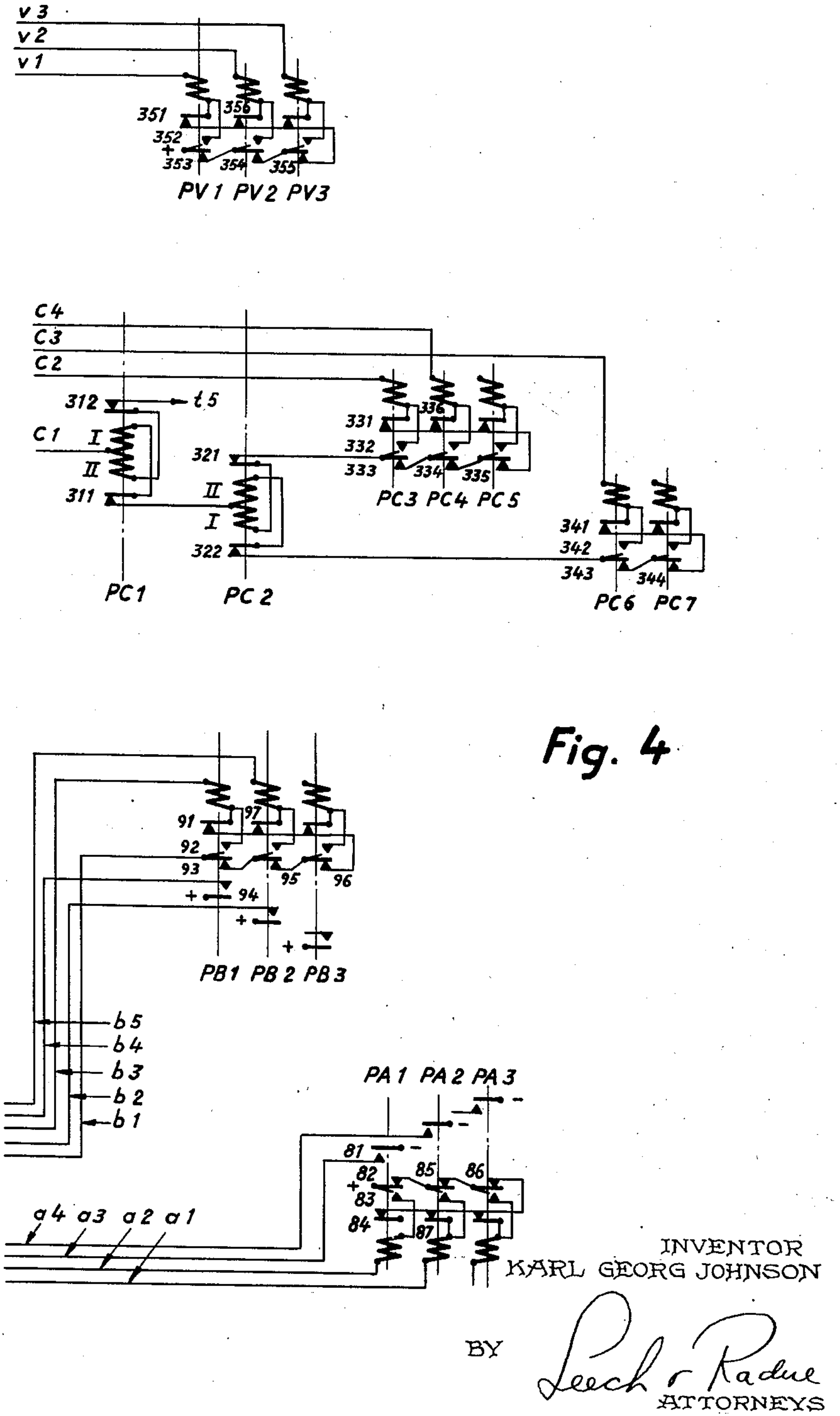
Fig. 4 shows all individual relay devices which are necessary for the switch step.

In Fig. 1 three cross bar switches, GA1, GB1 and GB2 are shown. A line L connected to an operating bar A1 in the crossbar switch GA1 has access to four intermediate lines *m1*—*m4* connected partly to the selecting bars SA1—SA4 in the cross bar switch GA1, partly to the operating bars B11—B12 and B21—B22, respectively, in the cross bar switches GB1 and GB2, respectively. The line L may over the intermediate lines *m1*—*m4* be connected to the lines F1—F13, of which F1—F7 pertain to a traffic direction T1, and F8—F13 to another traffic direction T2. The lines in both traffic directions are grouped to gradings. In the traffic direction T1 the line within the groups F1—F2 and F3—F4 should be selected at first hand and the lines F5—F7 not before all the lines F1—F4 are busy. In the traffic direction T2 one selects within the groups F8—F9 and F12—F13 at first hand and thereafter among the lines F10—F11. By help of Figs. 2–4 will be described below how a connection is set up between the line L and a line pertaining to the traffic direction T2. The connections from the line L are supposed to take place under control of a register not shown in the figures and a marker common to the whole telephone plant, to which marker the relay devices shown in Fig. 4 are pertaining. The register is connected to the line L on calls over especial selectors, in a manner not important for the invention. When the register has received a sufficient number of digits for the connection from the line L, for instance the relay VR2 in Fig. 3, is attracted by current over the wire *t4*. Relay VR2 pertains to the traffic direction T2. In Fig. 3 a relay VR1 is also shown, receiving current over the wire *t3* and pertaining to the traffic direction T1. When relay VR2 attracts its armature, the contacts 71—74 are closed. By connections from the line L or another line in Fig. 1 or 2 connected to the cross bar switch GA1 a not shown circuit is closed over the wire *t1* to relay GAH1, which attracts its armature, thus closing the contacts 11—14. Another relay GAH2, which is actuated by connections from other lines, is indicated to show how other primary selectors of the same kind as GA1 may be connected. Because of especial relay devices, not shown in the figures, only one relay GAH1 or GAH2 at a time can be actuated. Line L is supposed to be connected to the contact strips on an operating bar in the cross bar switch GA1 and may be reached by four selecting bars SA1—SA4, each of which being connected together over links *m1*—*m4* with its operating bar B11—B12 and B21—B22, respectively, in the secondary cross bar switches GB1 and GB2. Each operating bar B11—B12 and B21—22, respectively, is provided with a contact 101—102 and 201—202, respectively, which is actuated when the magnet of the operating bar attracts its armature. As long as the operating bar is free, its contact will be closed.

Contacts 11—14 are closed simultaneously with the contacts 71—74. The following circuits, which are partly converging, are thus completed:

1. From the positive pole of the exchange battery, called +, over contact 74 and wire *c1*, through winding I on relay PC1 in Fig. 4, contact 311, winding I on relay PC2, contacts 321, 333—335 and 331, winding on relay PC3, wire *c2*, contact 71, winding on relay MV21, break contacts 1001, 1002 connected in parallel for the lines F12—F13, wire *r1*, rectifier *e1*, connecting point P1, rectifiers *e11*—*e12* connected in parallel, contacts 101—102, and 11—12 to the negative side of the exchange battery, called negative. If both the operating bars B11 and B12 or both the lines F12 and F13 are busy this circuit can of course not be completed, as then both the contacts 101—102 or both the contacts 1001—1002 are broken.

2. +, contact 74, wire *c1*, winding I on relay PC1 contact 311, winding I on relay PC2, contacts 321, 333—335 and 336, winding on relay PC4, wire *c4*, contact 73, winding on relay MV23, break contact connected in parallel for the lines F8—F9, wire *r5*, rectifier *e4*, rectifiers *e21*—*e22* connected in parallel, contacts 201, 202 and 13—14 to negative. If both the operating bars B21 and B22 or both the lines F1 and F9 are busy, this circuit can not be completed.

3. +, contact 74, wire *c1*, winding I on relay PC1, contact 311, winding II on relay PC2, contacts 322, 343—344 and 341, winding on relay PC6, wire *c3*, contact 72, winding on relay MV22, contacts connected in parallel for the lines F10 and F11, wire *r3*, rectifiers *e2* and *e3*, respectively, rectifiers *e11*—*e12* and *e21*—*e22*, respectively, contacts 11—12 and 13—14, respectively, to negative. If all the operating bars B11, B12, B21 and B22 or both the lines F10 and F11 are busy, this circuit can not be completed.

The relays PC1 and PC2 are polarized relays with one middle position and two side positions. In the middle position contacts 311—312 are not actuated.

Winding I is on both relays provided with a considerably greater number of winding turns than the winding II. The two windings I and II magnetize the relay in the opposite directions. If the relay receives current through both the windings the winding I becomes deciding and contact 312 and 322, respectively, is broken. Wire *t5* is in Fig. 4 a communication, which is not closed by connections from the line L to the traffic direction T1 and T2, and thus relay PC1 will always actuate contact 312. Relay PC2 actuates contact 322 and breaks the circuit according to 3 above if one of the circuits according to 1 or 2 above is closed. Hereafter one of the relays PC3 or PC4 is operating, for instance PC3, which breaks away PC3 and PC5 and is self-held over contact 332. The relays PC5 and PC7 pertain to circuits which are void of interest in above described switching operating. If none of the circuits according to 1 or 2 above is closed, circuit 3 however being completed, relay PC2 will actuate contact 321 and relay PC6 attracts its armature, breaks away relay PC7 and is self-held over contact 342. It is here supposed that last-mentioned case takes place, relay MV22 in Fig. 3 thereby attracting its armature. Contacts 221—224 are actuated. Relay MV22 is self-held over contact 223. The following circuit is completed: +, contact 224, wire *r4*, winding on relay FG in Fig. 2, to negative. Relay FG attracts its armature. Contacts 51—55 are closed. The following circuits are formed: +, contact 55, wire *b1*, contacts 93, 95, 96, 91 and 97, respectively, winding on relay PB1 and PB2, respectively, wire *b5* and *b3*, respectively, contact 51 and 53, respectively, rectifiers *e11*—*e12* and *e21*—*e22*, respectively, contacts 101—102 and 201—202, respectively, to negative over contacts 11—12 and 13—14, respectively. One of the relays PB1 or PB2 attracts its armature. Thus rectifiers *e2* and *e3* separate the relay MV22 from the relays PB1 and PB2. Here is supposed that relay PB1 attracts its armature, breaks away the relays PB2 and PB3 and is self-held over contact 92 due to actuation of contacts 91—94. The following circuit is completed: +, contact 94, wire *b4*, contact 52, winding on relay GBH1, to negative. Relay GBH1 attracts its armature. Contacts 31—36 are closed. The following circuits are completed: +, contacts 82, 85, 86 in Fig. 4, 84 and 87, respectively, winding on relay PA1 and PA2, respectively, wire *a2* and *a1*, respectively, contacts 33 and 34, respectively, 101 and 102, respectively, and 11 and 12, respectively. One of the relays PA1 or PA2 attracts its armature, for instance PA1. Hereby the relays PB1 and PB2 are separated from relay PA1 by the rectifiers *e11* and *e12*. Contacts 81—84 are actuated. Relays PA2 and PA3 are broken away. Relay PA1 is self-held over contact 83. The relays PA3 and PB3 pertain to circuits, which are not necessary for the switching operation described here. The following circuit is completed: negative, contact 81, wire *a3*, contact 32, the winding on the selecting magnet for the selecting bar SA2, to +. Furthermore current is prepared for the operating magnet of operating bar B12. The magnet of the selecting bar SA2 attracts its armature and the magnet of the operating bar A11 receives current over wire *s1*, which is connected to negative at connections from the line L. Thus line L is connected to link *m2*.

Simultaneously with the selection of a free link *m2* selection of a free junction line takes place through the following circuits: +, contact 353, 354, 355 in Fig. 4, contact 351 and 356, respectively, winding on relay PV1 and PV2, respectively, wire *v1* and *v2*, respectively, contact 222 and 221, respectively, contact 1003 and 1004, respectively, winding on relay FA10 and FA11, respectively, to negative. One of the relays PV1 or PV2, for instance PV1, attracts its armature. Contacts 351—353 are actuated. Relays PV2 and PV3 are broken away and relay PV1 is self-held over contact 352. Relay FA10 is actuated. Contact 1004 is closed. For the sake of simplicity only contact 1005 pertaining to relay FA10 has been indicated in the figure. In reality there is a corresponding contact on all relays RA1—FA13 being connected to the selecting magnet for that selecting bar SB1—SB14, which pertains to the same junction line as the contact. The junction line F10 can be reached as well in the cross bar switch GB1 as in the cross bar switch GB2 and therefore two selecting bars SB3 and SB 13 pertain to the line F10. From the contact 1005 a circuit is closed over wire *s*2 through the lines on the magnets of the selecting bars SB3 and SB13. These magnets are actuated and + is connected to the operating magnet of the operating bar B12, which is also actuated, and thus link *m*2 is connected to line F10. Hereafter circuits are constituted, which are not indicated in the figures, for holding of the magnets of the operating bars A11 and B12, interruption of the current over wires *t*1, *s*1 and *t*4, and for actuation of relay FB10, whose winding is indicated in Fig. 3. Contact 1003 breaks the current of relay FA10, contact 1005 is opened and the current through the magnets of the selecting bars SB3 and SB13 is broken.

The relay PV3 in Fig. 4 is necessary by selection to the traffic direction T1, in which the three lines F5—F7 are constituting a group. If hereby the relay MV12 attracts its armature in the same manner as has been described above for relay MV22, relay PV3 becomes connected to the relay FA7 of the line F7 over wire *v*3 and contact 121. The selection among the links *m*1—*m*4 becomes the same as has been described above, but other selecting bars than SB1—SB14, shown in Fig. 2, will be connected.

Figure 6:
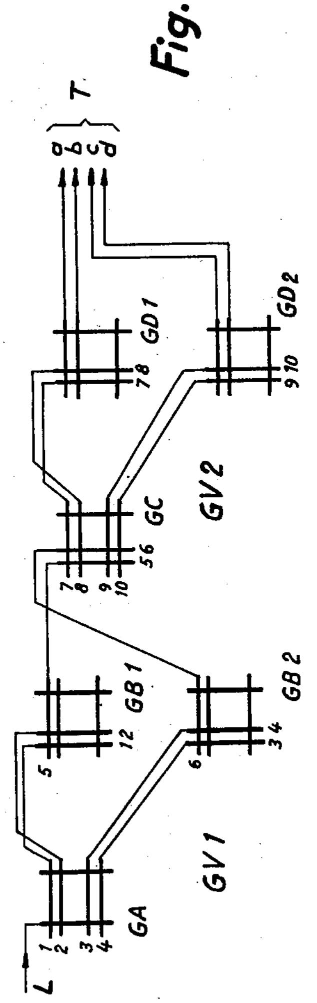
Fig. 6 shows two switch steps, each containing two selection stages.
Figure 7:
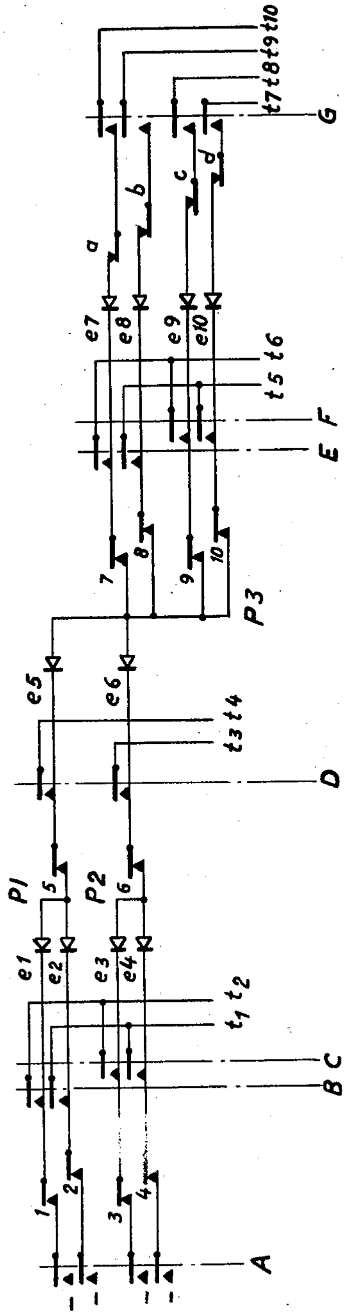
Fig. 7 shows how selections may take place through the two switch steps in Fig. 6 in dependence of each other.

In order to emphasize the applicability of the invention the Figures 6–7 have been drawn. Fig. 6 shows a number of connection paths through four selection stages for connection of a line L with a line *a*—*d* pertaining to a traffic direction T. In the selection stage GA there are four links 1—4 to choose between and in the selection stage GB there are two links 5—6. In the selection stage GC there are four links 7—10 and in the selection stage GD one of the lines *a*—*d* is selected. Fig. 7 shows the circuits over the indicating contacts of the links and the lines, 1—4, 5—6, 7—10 and *a*—*d*. The wires *t*1—*t*2, *t*3—*t*4, *t*5—*t*6 and *t*7—*t*10 pertain to relay devices similar to those shown in Fig. 4. The connection is supposed to be controlled by registers and markers not shown in the figure, which, however, cause actuation of the ralays A and G, whose contacts are shown in Fig. 7. Circuits from + is hereby closed through a number of relays corresponding to for instance PV1—PV3 in Fig. 4, over the wires *t*7—*t*10, rectifiers *e*7—*e*10, contacts 7—10, connecting point P3, retifiers *e*5—*e*6, contacts 5—6, connecting point P1 and P2, respectively, rectifiers *e*1—*e*2 and *e*3—*e*4, respectively, contacts 1—2 and 3—4, respectively, to negative. If there is a free connection path a relay is actuated in the relay device connected to the wires *t*7—*t*10. In dependence upon which relay is actuated a circuit is closed for one of the relays E or F and a relay device is connected over the wires *t*5—*t*6, the rectifiers *e*7—*e*10 thereby separating the wires *t*7—*t*10. The rectifiers *e*7—*e*10 have foremost for a purpose to separate possible faults, for instance earth faults, on one of the contacts *a*—*d*. Hereafter is selected between the wires *t*5 and *t*6, the relay D being actuated and still another relay device, which selects between the groups 1—2 and 3—4, is connected over the wires *t*3—*t*4. One of the relays B or C is actuated and a relay device, which is connected over the wires *t*1 and *t*2, selects one of the links 1—4. Each new relay device, which is connected, is separated from earlier selected or disconnected circuits by means of rectifiers. Thus possible faults are insulated and also a very great number of circuits may without inconvenience be connected together in the connecting points P1—P3. If some link or line is met with in two different cross bar switches, for instance the lines F10—F11 in Figs. 2–3, further rectifiers *e*1—*e*4 in Fig. 2 should be introduced to enable the indicating wire *r*3 to be connected to two connecting points P1 and P2.

I claim:

1. In a telephone system, a calling line, a group of lines to be called divided into subgroups, a primary and a secondary selection stage each containing selectors for connection of said calling line to a line in said called group of lines, said subgroups appearing in different combinations in the multiple field of the selectors in said secondary selection stage, a contact for each line in said called group and a contact for each selector in said secondary selection stage, means affecting said contacts for marking a free or busy condition for the line or selector, a battery, common marker conductors, means operated from said marker conductors connecting all said contacts for lines belonging to the same subgroup in parallel between said common marking conductors and one pole of said battery, means operated from said common marking conductors connecting all said contacts for secondary selectors which can be connected to said calling line over said primary selection stage and in which the same combination of subgroups appear in parallel between the other pole of said battery and a connecting point separate for said combination, rectifiers, said rectifiers joining one of said marking conductors with each of said connecting points which represents a combination including the subgroup corresponding to the marking conductor, a chain of test relays, one of said test relays being connected in series with each of said marking conductors and selecting a subgroup containing at least one idle line to which the calling line can be connected.

2. In a telephone system as described in claim 1 means selecting one idle line within said selected subgroup, means selecting one group of secondary selectors which can reach said selected subgroup and means selecting one idle selector in said selected group of secondary selectors, all said means cooperating for setting a communication between said calling line and said selected line.

KARL GEORG JOHNSON.

REFERENCES CITED

The following references are of record in the file of this patent:

UNITED STATES PATENTS

| Number | Name | Date |
|---|---|---|
| 1,593,387 | Clark | July 20, 1926 |
| 1,922,237 | Escott | Aug. 15, 1933 |